US008807816B2

(12) United States Patent
Desmet et al.

(10) Patent No.: US 8,807,816 B2
(45) Date of Patent: Aug. 19, 2014

(54) LUMINAIRE WITH FUNCTIONALITY-ENHANCING STRUCTURE

(75) Inventors: Lieven Raf Roger Desmet, Eindhoven (NL); Michel Cornelis Josephus Marie Vissenberg, Eindhoven (NL); Willem Lubertus Ijzerman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 280 days.

(21) Appl. No.: 13/265,293

(22) PCT Filed: Apr. 19, 2010

(86) PCT No.: PCT/IB2010/051682
§ 371 (c)(1),
(2), (4) Date: Oct. 21, 2011

(87) PCT Pub. No.: WO2010/122468
PCT Pub. Date: Oct. 28, 2010

(65) Prior Publication Data
US 2012/0033445 A1      Feb. 9, 2012

(30) Foreign Application Priority Data

Apr. 24, 2009  (EP) .................................... 09158683

(51) Int. Cl.
*G02B 6/10*  (2006.01)

(52) U.S. Cl.
CPC ............ *G02B 6/0038* (2013.01); *G02B 6/0046* (2013.01)
USPC ........... 362/606; 362/97.3; 362/612; 362/607

(58) Field of Classification Search
USPC .................. 362/97.1–97.3, 606, 607, 612
See application file for complete search history.

(56) References Cited

U.S. PATENT DOCUMENTS

| 5,237,641 A | 8/1993 | Jacobson et al. |
| 5,303,322 A | 4/1994 | Winston et al. |

(Continued)

FOREIGN PATENT DOCUMENTS

| JP | 2005300775 A | 10/2005 |
| WO | 9527915 A1 | 10/1995 |
| WO | 2008126023 A2 | 10/2008 |

*Primary Examiner* — Anabel Ton
(74) *Attorney, Agent, or Firm* — Yuliya Mathis

(57) ABSTRACT

A luminaire (20) comprising a light guide (11) having a first refractive index ($n_1$), the light guide (11) comprising a light-entry surface (14), a light-reflecting surface (15) for reflecting light entering at the light-entry surface (14), and a light-exit surface (16) opposite the light-reflecting surface (15), for allowing light to exit from the light guide (11), the light guide (11) being tapered toward the opposite end relative the light-entry surface (14). The luminaire (20) further comprises a light source (13), arranged to emit light toward the light-entry surface (14); a first optical member (17), having a second refractive index ($n_2$), in optical contact with the light-exit surface (16) of the light guide (11); a second optical member (18), having a third refractive index ($n_3$), in optical contact with the light-reflecting surface (15) of the light guide (11); and a functionality-enhancing structure (19) arranged on the opposite side of the second optical member (18) in relation to the light guide (11), for affecting an optical property of the luminaire (20) when the light source is in an off-state. The first refractive index ($n_1$) is greater than each of the second ($n_2$), and third ($n_3$) refractive indices, and the second refractive index ($n_2$) is greater than the third refractive index ($n_3$).

16 Claims, 2 Drawing Sheets

(56) References Cited

U.S. PATENT DOCUMENTS

| | | | |
|---|---|---|---|
| 7,847,882 B2* | 12/2010 | Kim et al. | 349/64 |
| 7,866,871 B2* | 1/2011 | Couzin et al. | 362/627 |
| 7,990,490 B2* | 8/2011 | Lee et al. | 349/62 |
| 2004/0096182 A1 | 5/2004 | Yamashita et al. | |
| 2005/0041410 A1 | 2/2005 | Yamashita et al. | |
| 2005/0094295 A1 | 5/2005 | Yamashita et al. | |
| 2006/0152827 A1 | 7/2006 | Yamashita et al. | |
| 2009/0167983 A1 | 7/2009 | Lee et al. | |
| 2010/0118562 A1* | 5/2010 | Kubo et al. | 362/606 |
| 2011/0255303 A1* | 10/2011 | Nichol et al. | 362/606 |

* cited by examiner

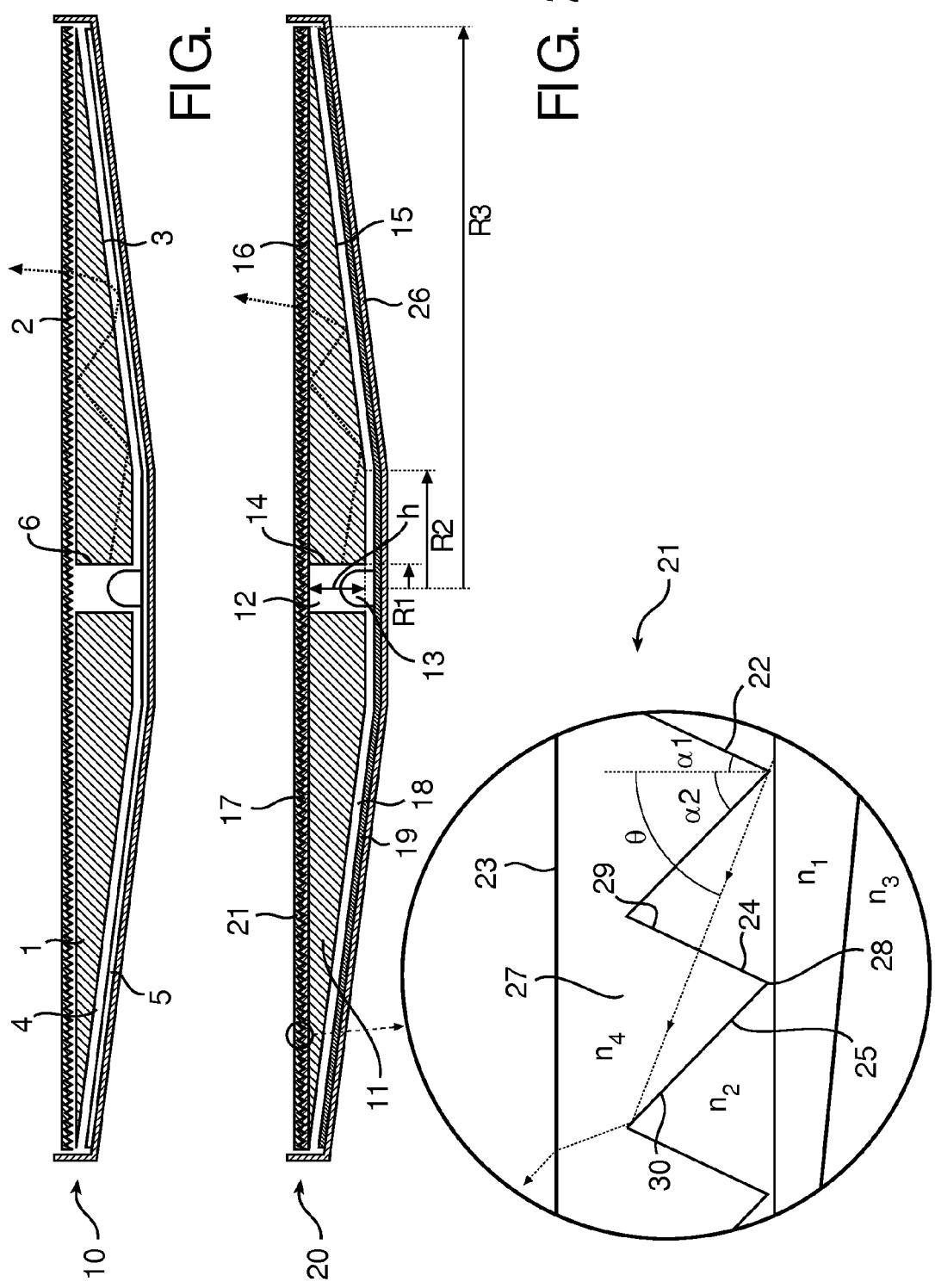

LUMINAIRE WITH FUNCTIONALITY-ENHANCING STRUCTURE

TECHNICAL FIELD

The present invention generally relates to a luminaire.

BACKGROUND OF THE INVENTION

Flat LED-based luminaries are expected to increasingly replace, for example, tube luminescent based luminaries. For example, flat LED-based luminaries may comprise a centrally arranged light source cavity and a wedge-shaped optical light guide in which light that is in-coupled into the light guide at the cavity travels through total internal reflection. Such luminaries involve several advantages, for example in that they are planar, compact, and relatively unobtrusive.

In case the optical light guide is surrounded by air, light can exit from both top and bottom wedge surfaces, which may not be desirable for various applications. To address this issue, WO 2008/126023 discloses a luminaire comprising a reflector arranged on one side of the light guide for reflecting the light that has escaped toward the opposite direction relative the desired exit surface. Although WO 2008/126023 provides for a compact luminaire from which light is only output through the light-exit surface, the optical properties of the luminaire, at least in its off-state, are largely determined by the properties of the reflector, which may not be desirably for all applications.

SUMMARY OF THE INVENTION

In view of the above-mentioned and other drawbacks of the prior art, a general object of the present invention is to provide an improved luminaire, and more specifically to provide a more flexible luminaire in respect of its optical properties.

According to a first aspect of the invention, there is provided a luminaire comprising a light guide having a first refractive index, the light guide comprising a light-entry surface, a light-reflecting surface for reflecting light entering at the light-entry surface, and a light-exit surface opposite the light-reflecting surface, for allowing light to exit from the light guide, the light guide being tapered toward the opposite end relative the light-entry surface. The luminaire further comprises a light source, adapted to emit light through the light-entry surface; a first optical member, having a second refractive index, in optical contact with the light-exit surface of the light guide; a second optical member, having a third refractive index, in optical contact with the light-reflecting surface of the light guide; and a functionality-enhancing structure arranged on the opposite side of the second optical member in relation to the light guide, for affecting an optical property of the luminaire when the light source is in an off-state, wherein the first refractive index is greater than each of the second, and third refractive indices, and the second refractive index is greater than the third refractive index.

The inventors have realized that by providing first and second optical members and by suitably selecting refractive indices of these optical members, light can be selectively out-coupled through the desired light-exit surface without the need for a reflector. This means that the core, i.e. the light guide and both optical members surrounding the light guide, of the luminaire can be made transparent.

The inventors have further realized that the transparency of the core can be used to achieve added functionality and/or enhanced optical performance to the luminaire through the provision of a functionality-enhancing structure which will be visible through the core. Such a functionality-enhancing structure can thus influence an optical property of the luminaire, at least when the light-source comprised in the luminaire is in its off-state. The luminaire characteristics may hence be adapted to the particular application, by selecting a certain functionality-enhancing structure. The functionality-enhancing structure may even be exchangeable, allowing the user of the luminaire to change the characteristics of the luminaire by exchanging the functionality-enhancing structure.

The functionality-enhancing structure may advantageously comprise a screen that is spaced apart from the light guide. Alternatively, the functionality-enhancing structure may be provided in the form of a coating, applied to the surface of the second optical member opposite the light guide.

According to various embodiments of the invention, the functionality-enhancing structure may be configured to absorb light, whereby the contrast of the luminaire can be increased, which may be advantageous, particularly in case the luminaire is used in bright ambient light. The absorbing functionality-enhancing structure may, for example, be embodied in the form of a layer of a light-absorbing substance.

Furthermore, the functionality-enhancing structure may be configured to selectively absorb light in a particular wavelength range, in which case the functionality-enhancing structure may be provided in the form of a colored structure, which, in addition to an increased contrast, results in a visual effect, particularly in the luminaire off-state.

Moreover, the functionality-enhancing structure may have controllable optical properties. To this end, the functionality-enhancing structure may, for example, include a display, OLEDs, LEDs etc. The optical properties may hence be controlled between different states, for example on and off, or any other state that the optical properties of the functionality-enhancing structure allow, for achieving different visual and/or optical effects in addition to the states of the luminaire, such as on, off and dimming. In other words, a luminaire in, for example, its on-state may obtain variable optical properties through a functionality-enhancing structure with controllable optical properties, such as a display showing alternating information, LEDs that are switched on and off, etc.

In various embodiments of the luminaire according to the present invention, the light-guide may be configured in such a way that the light entry surface connects the light reflecting surface and the light exit surface.

The first optical member may be an optical fluid, which may be advantageous in various applications. The fluid may have a relatively low refractive index which allows a considerable design freedom when selecting material for the light guide.

Further, the second optical member may be an air gap between the light guide and the functionality-enhancing structure.

Furthermore, with the present-day optical materials the ratio between the first refractive index and the second refractive index may vary in the range of 1 to 2 for the light emitted from the light-entry surface to be reflected by the light-reflecting surface and emitted at the light-exit surface.

Moreover, the luminaire may be circular symmetric, the exit surface of the light guide being arranged in one plane. Circular symmetry enables for provision of a symmetric light beam, which is often desired in for example downlighting applications.

Furthermore, the luminaire may additionally comprise a light redirection layer, having a structured light-entry surface and a planar light-exit surface, the light redirection layer being arranged in optical contact with the first optical member opposite the light guide, the redirection layer having a fourth refractive index, being greater than the second refractive index. With present-day optical materials the ratio between the fourth and second optical indices may vary in the range of 1 to 2. The fourth refractive index may hence be selected so as for the light to be output in the forward aim direction of the luminaire.

Moreover, the structured light-entry surface of the redirection layer may comprise ridge-shaped protrusions comprising a base and a peak, and first and second sides connecting the base to the peak, wherein the first side comprises a first facet for in-coupling of light, which first facet has a first inclination angle with respect to the normal of the light-exit surface of the light-guide, and the second side comprises a second facet for total internal reflection of light, which second facet has a second inclination angle, with respect to the normal of the light-exit surface of the light-guide. The first and second inclination angles may have magnitudes. With this structure, the light is efficiently reflected by the second facet, its inclination angle in relation to the inclination angle of the first facet for in-coupling of light determining the output direction of light from the luminaire.

Additionally, each of the protrusions may further comprise a third facet, having a third inclination angle with respect to the normal of the light-exit surface, being smaller than the first inclination angle, so as for a part of the light to be directed by the third facet, such as to improve the out-coupling of light toward the forward aim direction of the luminaire. However, the closer the third inclination angle is to the first inclination angle, the more light may be directed toward the functionality-enhancing structure, for affecting an optical property of the luminaire when the light-source is in its on-state.

The third facet may be arranged closer to the base than the first facet with the advantage that a part of the light that is in-coupled at the base of the first side of each protrusion may be refracted toward the second facet, hence increasing the light output in the forward aim direction of the luminaire.

Moreover, the third angle may be in the range between 0 degrees and the first inclination angle, to facilitate manufacturing of the light redirection layer.

Moreover, the third angle may be in the range between 0 degrees and the second inclination angle, whereby an undercut structure may be obtained.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 1 is a cross-sectional view of a luminaire of prior art;
FIG. 2a is a cross-sectional view of a luminaire according to an embodiment of the present invention.
FIG. 2b is a perspective view of the luminaire in FIG. 2a.

DETAILED DESCRIPTION

Figure 2B:
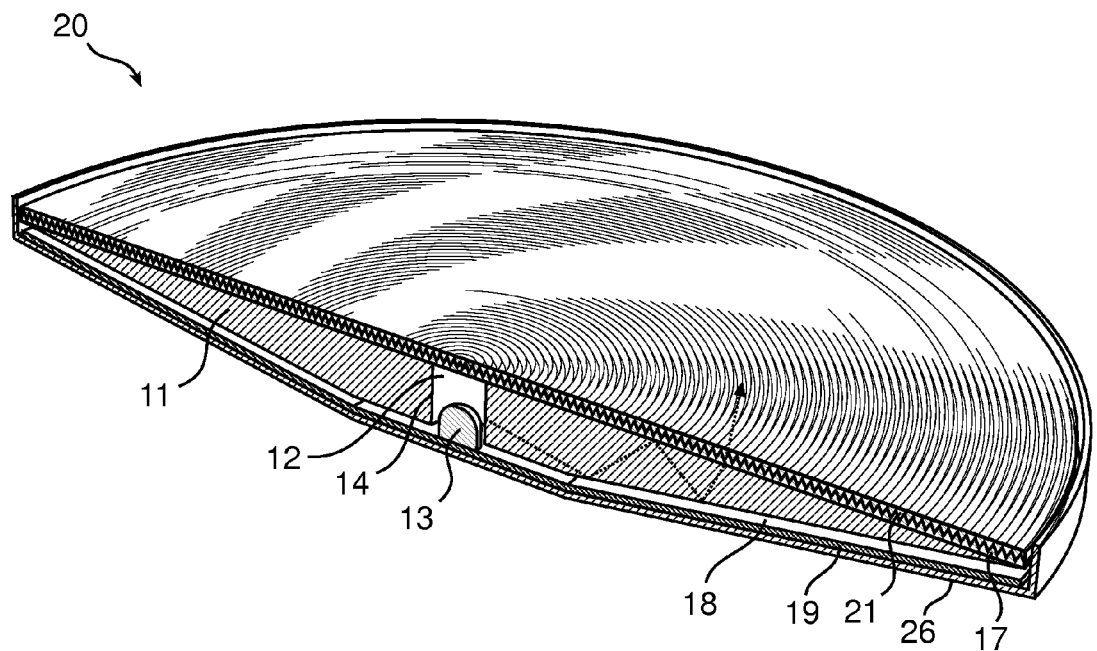

In the example of a prior art luminaire illustrated in FIG. 1, a light guide comprises first 2 and second 3 opposite surfaces connected by a light-entry surface 6, which light guide 1 is tapered so that the two opposite surfaces 2, 3 are closer to each other in the end opposite the light-entry surface 6. The light guide is surrounded by air 4. In operation, the light enters via the light-entry surface 6. Thereafter, the light may escape from both surfaces of the light guide 1 as is schematically illustrated in FIG. 1. To ensure that light is output from the luminaire 10 in the desired direction only, the luminaire 10 is, as shown in FIG. 1, provided with a reflector 5, such as a specular mirror. The reflector is arranged to reflect all of the light that is out-coupled from the light guide through the second surface 3 back through the light guide so that all of the light is output through the first surface of the light guide.

FIGS. 2a-b illustrate a cross-sectional view and a perspective view of an example of a luminaire according to an embodiment of the present invention. The shown luminaire 20 comprises a light guide, here, circular symmetric in one plane. The light guide 11 has a cavity 12 in which a light source 13 is arranged. The inner surface of the cavity 12 constitutes a light-entry surface 14 of the light guide 11. The light guide 11 further comprises a light-reflecting surface 15 and a light-exit surface 16, that are connected by the light-entry surface 14. The light guide 11 is moreover tapered so that the distance between the light-reflecting surface 15 and the light-exit surface 16 is shorter at the circumference of the circular light guide 11 than at the light-entry surface 14. Here, the light-exit surface 16 is arranged in a single plane. A first optical member 17 is arranged in optical contact with the light-exit surface 16 of the light guide 11, and a second optical member 18 is arranged in optical contact with the light-reflecting surface 15 of the light-guide 11. As is schematically illustrated in FIGS. 2a-b, functionality-enhancing structure 19 is arranged on a screen 26, on the opposite side of the second optical member 18 relative the light guide 11. Further, a structured redirection layer 21 is arranged on the opposite side of the first optical member 17 relative the light guide 11.

The light guide is made of an optically transparent material having a first refractive index $n_1$. For example, the light guide may be made of glass or any optical polymer such as polymethyl methacrylate, PMMA, which has a refractive index of 1.49, or polycarbonate, which has a refractive index of 1.59.

The first optical member 17 has a second refractive index $n_2$, and the second optical member 18 has a third refractive index $n_3$. Through a suitable choice of the refractive indices of the first 17 and second 18 optical members, the out-coupling from the light guide 11, having a first refractive index $n_1$, can be controlled to practically exclusively take place through the light-exit surface 16 of the light guide 11. For example the first optical member may be a fluid with a refractive index of 1.29, and the second optical member may be air, having a refractive index of 1. Accordingly, the mirror used to achieve the selective out-coupling in the prior art luminaire 10 in FIG. 1 can be dispensed with, whereby the luminaire 20 can be made transparent. In other words, a viewer can, at least when the light-source 13 of the luminaire 20 is in its off-state, see straight through the luminaire 20. This effect following from the provision of the first 17 and second 18 optical members is, according to various embodiments of the present invention, used to control one or several optical properties of the luminaire 20 through the provision of the functionality-enhancing structure 19. In the exemplary embodiment that is schematically illustrated in FIGS. 2a-b, the functionality-enhancing structure 19 is provided in any form of a selectively absorbing paint layer, such as a color paint layer. However, the functionality-enhancing structure 19 may be any structure capable of affecting an optical property of the luminaire. Examples of functionality-enhancing structures are a display, LEDs, a color layer, etc. If the functionality-enhancing structure can be switched between a non-transparent and a transparent state, and the screen 26 or a housing of the luminaire is transparent, the luminaire can be made optically transparent, which may be advantageous for applications where a relatively unobtrusive design is desired.

Further, a redirection layer 21, such as a so called redirection foil, is arranged in optical contact with the first optical member 17, on the opposite side of the first optical member 17 relative the light guide 11. A light-entry surface 22 of the redirection layer 21 comprises ridge-shaped protrusions arranged to encircle the center of the luminaire 20. Each protrusion has two sides 29, 30 connecting a base 27 and a peak 28 of each protrusion. The first side 29 comprises a first facet 24 having a first inclination angle $\alpha_1$, and the second side 30 comprises a second facet 25 having a second inclination angle $\alpha_2$, with respect to the normal of the light-exit surface of the light-guide. The light-exit surface 23 is flat and parallel to the light-exit surface of the light-guide.

The numerical range of the ratio between the indices of the refraction layer 21 and the first optical member 17, which is determined by the materials of the light guide 11 and the redirection layer 21, may be selected to be within the range of 1 to 2 for present-day optical materials. The redirection layer may be made of polycarbonate, PC, which has a refractive index of 1.59.

Hence, the light out-coupled at the exit-surface of the light-guide 16 is refracted by the first optical member 17 and in-coupled through the first facet 24 of the light redirection layer 21. A large amount of the light is refracted toward the second facet 25 to be reflected and refracted in the forward aim direction at the light-exit surface 23 of the redirection layer 21. Generally, the second inclination angle $\alpha_2$ of the second facet 25 is smaller than the desired out-coupling angle $\theta$ of the grazing incidence light rays according to the normal of the light guide, wherein $\theta$ is the angle of the outermost ray that can hit the second facet 25 and is refracted into ambient with an angle $\frac{1}{2}\theta_{FWHM}$.

By way of example, the desired full width at half maximum intensity (FWHM) may be 2×5°. The light guide 11 may have a thickness h of 4 mm, have a diameter R3 of 55 mm with a flat top radius R2 of 20 mm and a central cavity radius R1 of 3.5 mm. Here, the light guide 11 material has been selected to consist of PMMA, having a refractive index $n_{PMMA}=1.49$, the redirection layer 21 consists of PC, having a refractive index $n_{PC}=1.59$, and the second optical member 18 is an air gap, with refractive index $n_{air}=1$, whereby the desired refractive index for the first optical member 17 is calculated to be 1.30 or smaller. The first optical member 17 may therefore be an optical fluid with refractive index $n_{fluid}=1.29$.

Given the desired FWHM, the first inclination angle of the first facet of the redirection layer 21 is selected to be $\alpha_1=26.5°$ and the second inclination angle of the second facet is selected to be $\alpha_2=31.4°$.

Figure 3:
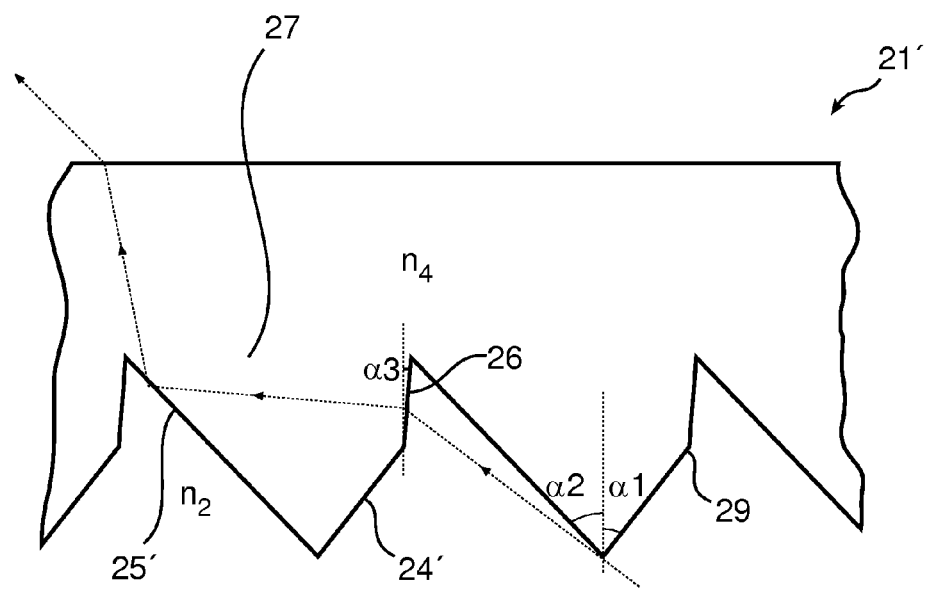
FIG. 3 is a cross-sectional view of a portion of an exemplary redirection layer comprised in various embodiments of the luminaire according to the present invention.

In FIG. 3 an alternative redirection layer 21' is illustrated, wherein the first side 29 comprises a third facet 26 at the base of each protrusion. The third inclination angle $\alpha_3$ of the third facet 26 may be selected so as to allow an additional part of light to be directed toward the second facet 25' and reflected to be out-coupled in the forward aim direction of the luminaire. Here, an inclination angle that is in the range between 0 degrees and the first inclination angle of the first facet $\alpha_1$, with respect to the normal of the light-exit surface of the light guide, is selected. The third inclination angle $\alpha_3$ can be varied in the range $-\alpha_2$ to $\alpha_1$, $\alpha_1$ and $\alpha_2$ having positive values. For a third inclination angle $\alpha_3$ between 0 degrees and $-\alpha_2$ degrees, the structure is undercut. The more the third inclination angle $\alpha_3$ approaches the first inclination angle $\alpha_1$, the more light will be directed toward the functionality-enhancing structure.

Even though the invention has been described with reference to specific exemplifying embodiments thereof, many different alterations, modifications and the like will become apparent for those skilled in the art. For example, the luminaire may be of other shapes than circular symmetric, such as hexagonal shape, an asymmetric shape, etc.

The functionality-enhancing structure may be a display showing fixed or moving information, a set of LEDs or OLEDs, an appearance modifying skin that may be controlled to change appearance, for example from one color to another, etc. In another example, the functionality-enhancing structure may be switched on or off, or controlled between different states separate from or together with the optical state of the light source comprised in the luminaire.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:

1. A luminaire comprising
a light guide having a first refractive index ($n_1$), the light guide comprising
a light-entry surface,
a light-reflecting surface for reflecting light entering at the light-entry surface, and
a light-exit surface opposite said light-reflecting surface, for allowing light to exit from the light guide,
the light guide being tapered toward the opposite end relative the light-entry surface, said luminaire further comprising
a light source, arranged to emit light toward said light-entry surface;
a first optical member, having a second refractive index, in optical contact with the light-exit surface of the light guide;
a second optical member, having a third refractive index in optical contact with the light-reflecting surface of the light guide; and
a functionality-enhancing optical structure arranged on the opposite side of said second optical member in relation to the light guide, for affecting an optical property of said luminaire when the light source is in an off-state,
wherein the first refractive index is greater than each of the second, and third refractive indices, and the second refractive index is greater than the third refractive index, wherein said second optical member is air.

2. The luminaire according to claim 1, wherein said functionality-enhancing structure comprises a screen spaced apart from the light guide.

3. The luminaire according to claim 1, wherein said functionality-enhancing optical structure is configured to absorb light.

4. The luminaire according to claim 1, wherein said functionality-enhancing optical structure has controllable optical properties.

5. The luminaire according to any of the preceding claim 1, wherein said first optical member is an optical fluid.

6. The luminaire according to claim 1, wherein the ratio between the first and second refractive indices is in the range of 1 to 2.

7. The luminaire according to claim 1, said luminaire being circular symmetric, the exit surface being arranged in one plane.

8. The luminaire according to claim 1 further comprising a light redirection layer, having a structured light-entry surface and a planar light-exit surface, said light redirection layer being arranged in optical contact with the first optical member opposite the light guide, said redirection layer having a fourth refractive index, being greater than the second refractive index.

9. The luminaire according to claim 8, wherein the ratio between the fourth and second refractive indices is in the range of 1 to 2.

10. The luminaire according to claim 9, wherein the structured light-entry surface of the redirection layer comprises ridge-shaped protrusions comprising a base and a peak, and first and second sides connecting said base and said peak, wherein the first side comprises a first facet for in-coupling of light, which first facet has a first inclination angle with respect to the normal of the light-exit surface of the light-guide, and the second side comprises a second facet for total internal reflection of light, which second facet has a second inclination angle, with respect to the normal of the light-exit surface of the light-guide.

11. The luminaire according to claim 10, wherein each of said protrusions, on the first side, further comprises a third facet having a third inclination angle with respect to the normal of the light-exit surface, being smaller than the first inclination angle.

12. The luminaire according to claim 11, wherein the third facet is arranged closer to the base than the first facet.

13. The luminaire according to claim 11, wherein the third angle is in the range between 0 degrees and the first inclination angle.

14. The luminaire according to claim 11, wherein the third angle is in the range between 0 degrees and the second inclination angle.

15. A luminaire comprising
a light guide having a first refractive index ($n_1$), the light guide comprising
a light-entry surface,
a light-reflecting surface for reflecting light entering at the light-entry surface, and
a light-exit surface opposite said light-reflecting surface, for allowing light to exit from the light guide,
the light guide being tapered toward the opposite end relative the light-entry surface, said luminaire further comprising
a light source, arranged to emit light toward said light-entry surface;
a first optical member, having a second refractive index, in optical contact with the light-exit surface of the light guide;
a second optical member, having a third refractive index, in optical contact with the light-reflecting surface of the light guide; arid
a functionality-enhancing optical structure arranged on the opposite side of said second optical member in relation to the light guide, for affecting an optical property of said luminaire when the light source is in an off-state,
wherein the first refractive index is greater than each of the second, and third refractive indices, and the second refractive index is greater than the third refractive index, and wherein the ratio between the first and second refractive indices is in the range of 1 to 2.

16. A luminaire comprising
a light guide having a first refractive index ($n_1$), the light guide comprising
a light-entry surface,
a light-reflecting surface for reflecting light entering at the light-entry surface, and
a light-exit surface opposite said light-reflecting surface, for allowing light to exit from the light guide,
the light guide being tapered toward the opposite end elative the light-entry surface, said luminaire further comprising
a light source, arranged to emit light toward said light-entry surface;
a first optical member, having a second refractive index, in optical contact with the light-exit surface of the light guide;
a second optical member, having a third refractive index, in optical contact with the light-reflecting surface of the light guide;
a functionality-enhancing optical structure arranged on the opposite side of said second optical member in relation to the light guide, for affecting an optical property of said luminaire when the light source is in an off-state, wherein the first refractive index is greater than each of the second, and third refractive indices, and the second refractive index is greater than the third refractive index; and
a light redirection layer, having a structured light-entry surface and a planar light-exit surface, said light redirection layer being arranged in optical contact with the first optical member opposite the light guide, said redirection layer having a fourth refractive index, being greater than the second refractive index.

* * * * *